(12) United States Patent
Pande et al.

(10) Patent No.: US 11,178,439 B2
(45) Date of Patent: Nov. 16, 2021

(54) SYSTEMS AND METHODS FOR OPTIMIZING BANDWIDTH FOR DATA TRANSMISSION

(71) Applicant: Rovi Guides, Inc., San Jose, CA (US)

(72) Inventors: Siddhartha Pande, Bengaluru (IN); Madhusudhan Srinivasan, Bangalore (IN); Deviprasad Punja, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/715,993

(22) Filed: Dec. 16, 2019

(65) Prior Publication Data

US 2021/0185374 A1 Jun. 17, 2021

(51) Int. Cl.
*H04N 21/24* (2011.01)
*H04N 21/2385* (2011.01)
(Continued)

(52) U.S. Cl.
CPC ..... *H04N 21/2402* (2013.01); *H04N 21/2385* (2013.01); *H04N 21/26606* (2013.01);
(Continued)

(58) Field of Classification Search
CPC .......... H04N 21/2402; H04N 21/2385; H04N 21/26606; H04N 21/6405; H04N 21/643; H04N 21/8456
See application file for complete search history.

(56) References Cited

U.S. PATENT DOCUMENTS

2003/0182429 A1 9/2003 Jagels
2007/0136741 A1* 6/2007 Stattenfield .......... G11B 27/105
725/32
(Continued)

FOREIGN PATENT DOCUMENTS

WO 2017011798 1/2017

OTHER PUBLICATIONS

"Digital program insertion cueing message for cable television systems", ITU-T Standard, International Telecommunication Union, Geneva; CH, No. J.181, Jan. 13, 2014.
(Continued)

*Primary Examiner* — June Y Sison
(74) *Attorney, Agent, or Firm* — Haley Guiliano LLP (57) ABSTRACT

Systems and methods are disclosed herein for optimizing bandwidth for broadcast transmission. The disclosed techniques herein provide for receiving first and second content for transmission to subscriber devices on a first and second channels. The system then determines whether the first and second content contain a common segment. If so, the system updates metadata schema (e.g., homogeneous channel descriptor, homogeneous switch descriptor) to indicate there is a common segment. The system may generate a transport stream during multiplexing of the first and second channels based on the updated metadata schema. The transport stream, for a time duration based on the at least one common segment, includes a first audio feed of the first content and a first video feed of the first content to be provided on the second channel. The system then transmits the transport stream to the one or more subscriber devices.

16 Claims, 9 Drawing Sheets

(51) Int. Cl.
    *H04N 21/266*    (2011.01)
    *H04N 21/6405*   (2011.01)
    *H04N 21/643*    (2011.01)
    *H04N 21/845*    (2011.01)

(52) U.S. Cl.
    CPC ....... *H04N 21/643* (2013.01); *H04N 21/6405* (2013.01); *H04N 21/8456* (2013.01)

(56) References Cited

U.S. PATENT DOCUMENTS

| | | |
|---|---|---|
| 2008/0181575 A1 | 7/2008 | Girard et al. |
| 2013/0070839 A1* | 3/2013 | Magee .................... H04L 65/80 375/240.02 |
| 2014/0081988 A1* | 3/2014 | Woods ................. G06Q 10/101 707/748 |
| 2014/0245346 A1 | 8/2014 | Cheng et al. |
| 2015/0346955 A1* | 12/2015 | Fundament ........ H04N 21/4821 715/765 |
| 2016/0182923 A1 | 6/2016 | Higgs et al. |
| 2017/0019719 A1* | 1/2017 | Neumeier ........... H04N 21/8456 |
| 2017/0034578 A1* | 2/2017 | Patel .................. H04N 21/4542 |
| 2017/0171611 A1* | 6/2017 | Nair ....................... H04N 21/84 |
| 2019/0200065 A1 | 6/2019 | Haberman et al. |
| 2020/0053435 A1* | 2/2020 | Denoual .......... H04N 21/26258 |

OTHER PUBLICATIONS

PCT International Search Report and Written Opinion for International Application No. PCT/US2020/064908, dated Apr. 7, 2021 (17 pages).

* cited by examiner

```
homogenous_channel_descriptor
{
        descriptor.tag:    8 bits
        descriptor.length: 8 bits for (i=0, i<num_Of.channelgroups; i++)
        {
                unique_identifier of channel carrying primary content for (j=0, j<num_aux channels, j++)
                {
                        unique identifier for channel.comprises
                        aux.content
                }
        }
}
```

| Star Sports Select 1 @ Rs xx Airtel | MPEG 4 | 13259 = SID 3041 = VPID | Audio= AAC-ADTS PID 3042 = eng | 11602 = Transponder Freq H = Polarisation 32600 = Transponder Bandwidth |
|---|---|---|---|---|
| Star Sports 1 @ Rs xx Airtel | MPEG 4 | 2226 = SID 5181 = VPID | Audio= AAC-ADTS PID 5102 = eng | 11582 = Transponder Freq V = Polarisation 32700 = Transponder Bandwidth |

```
homogeneous_switch_descriptor
{
        descriptor.tag:    8 bits
        descriptor.length: 8 bits switch-state = on/off
}       time of switch    = -1
```

SYSTEMS AND METHODS FOR OPTIMIZING BANDWIDTH FOR DATA TRANSMISSION

BACKGROUND

The present disclosure is directed to techniques for optimizing bandwidth in data transmissions.

SUMMARY

Broadcast systems communicate a large amount of data across various communication paths. It has been observed that, at times, multiple channels broadcast substantially similar content but are treated as two different content during transmission or broadcasting and hence there are inefficiencies. For example, media providers provide (e.g., by way of broadcasting, streaming, or otherwise transmitting data) substantially similar content on two different channels. More particularly, a media provider might provide a premium subscription channel that includes particular premium content during some specific segments, for example during advertisement segments, while also providing another channel having identical content with respect to a standard subscription during most of the other segments. Typically, the premium channel and the standard channel are provided as two separate feeds for transmissions from a headend (or server). Similar inefficiency exists when the headend receives a television program for broadcast on a particular channel, only to receive the same television program for broadcast on another channel a few hours later, with only the advertisements differing. Typically, while the respective content of two related channels are substantially similar at the headend or server side, these two channels are treated as distinct channels and are transmitted as two different sets of content. As a result of ignoring the commonality between two channels, the headend or server performs duplicative operations on the channels, such as compression, multiplexing, encoding and other such operations. The result is an inefficient use of network resources by utilizing almost double the bandwidth for significantly duplicative content.

Accordingly, techniques are disclosed herein for optimizing bandwidth for data transmission. In at least one embodiment, the system may receive a first content (e.g., a first video data) on one channel, and a second content (e.g., a second video data) for transmission on a second channel for transmission to a subscriber device. For example, the first content may be a standard version video of a cricket match and the second content may be a premium version video of the same cricket match in which most of the content of the premium version video is the same as the standard version video but is different only during certain segments. In some embodiments, the system of the present disclosure determines, using techniques disclosed herein, how two pieces of content are similar or distinct. Similarity determination may include comparing similarity of RGB matrices of video frames of the respective pieces of content at the same time segment and comparing information in metadata of the respective pieces of data at the same time segment. In some embodiments, the similarity or distinction between two pieces of content may be determined using specific markers provided by the content creator. In some embodiments, the similarity or distinction between two pieces of content may be determined by comparison of matching checksum calculations relative to a predefined overlap threshold. If the overlap threshold is met, the system retrieves, from the headend or server, identifiers of the premium cricket match corresponding to those temporal segments which differ.

Upon determination that the first and second content contain common segments, the system updates the metadata schema. In some embodiments, the metadata schema includes homogeneous channel descriptors and homogeneous switch descriptors. For example, data relating to common segments between the standard and premium cricket matches are identified and updated via the homogeneous channel descriptors for a channel group containing the standard and premium cricket matches. In some embodiments, insertion of the metadata schema may be done by using private descriptors in standardized MPEG system table such as a program map table ("PMT").

The system may then generate a transport stream during multiplexing of the first channel and of the second channel based on the updated metadata schema. The transport stream includes a first audio feed of the first content and a first video feed of the first content to be provided on the second channel for a time duration based on the at least one common segment. For example, while watching the premium cricket match on channel 2, the premium cricket match on channel 2 will provided the audio and video feed from channel 1 associated with the standard cricket match as both feeds, for the specific time duration, have identical content. This is communicated to the subscriber device by the metadata schema which may be embedded in the PMT. The system may then transmit these differing segments to a subscriber device which has selected the premium cricket match for broadcast during those temporal segments for which the standard cricket match plays advertisements. In some embodiments, the system signals information about the differing segments by inserting the data relating to the differing segments into a metadata schema using a transport stream. In some embodiments in which the system uses IP broadcasting, a multi-cast IP port (corresponding to the second content) is transmitted to the subscriber device for the differing temporal segments.

In this way, the disclosed techniques achieve efficient use of network resources by avoiding the duplicative transmission of substantially similar content and only transmitting the differing segments for the premium broadcast. Moreover, this creates an opportunity to transmit auxiliary content (e.g., additional premium content) using some or all of the bandwidth being saved by avoiding duplicative transmissions.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
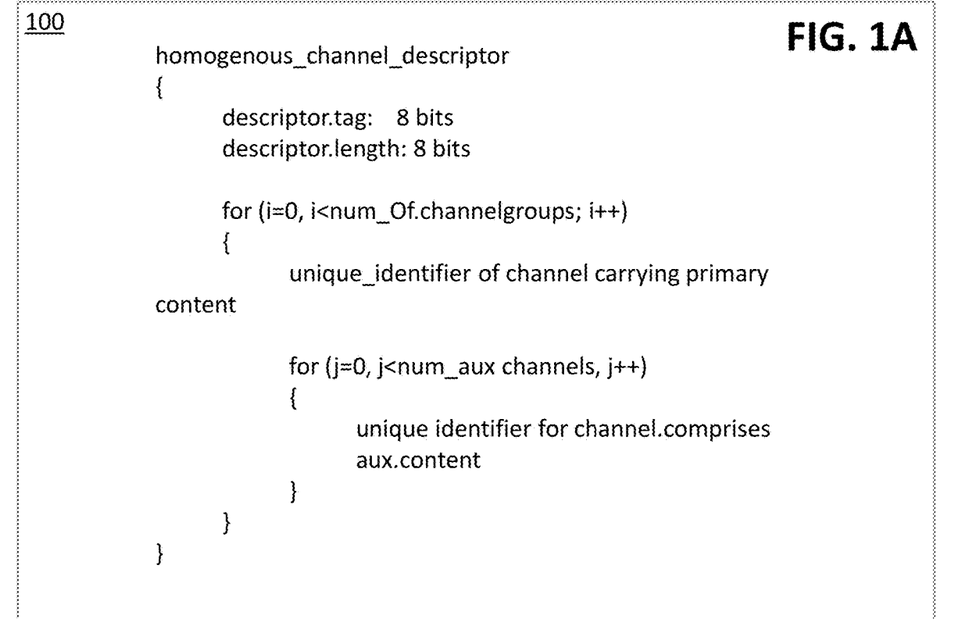
FIG. 1A shows an illustrative diagram of a homogeneous channel descriptor exemplary signaling mechanism, in accordance with some embodiments.

FIG. 1A shows an illustrative diagram of a homogeneous channel descriptor 100 exemplary signaling mechanism, in accordance with some embodiments. The homogeneous channel descriptor may be used to describe the two or more channels that are carrying identical content for most of the time to one or more subscriber devices. The homogeneous channel descriptor is a type of metadata schema. Any metadata schema may be used to describe channel attributes and characteristics to the one or more subscriber devices. The metadata schema may be embedded in a program map table ("PMT") or other mechanism during the multiplexing process where all channel information is multiplexed into a transport stream. In some embodiments for a typical digital broadcasting context, the metadata schema implemented is a homogeneous channel descriptor. Though the descriptor is named "homogeneous_channel_descriptor," the metadata schema may be of any alternate name that uniquely maps a channel delivering content to numerous similar channels that carry common content for overlapping durations. While FIG. 1A is mainly focused on broadcast transmission channels, the same may apply to other form of content delivery that include but not limited to IP/Hybrid/OTT ("Over the top"). In such instances, the descriptor may take on suitable format corresponding to the metadata format supported by such transmission mediums. The metadata scheme (e.g., homogeneous channel descriptor) or its equivalents map a primary channel to one or more auxiliary channels. A primary channel may be a channel that all subscribing devices tune to, and the one which delivers most of the common content across the group of channels (called a channel group). Auxiliary channels may be channels that show content that is different from the primary channel for small periods of time. Each auxiliary channel in the channel group carries auxiliary content that is unique to itself Returning to FIG. 1A, the homogeneous channel descriptor 100 may group related channels that carry similar content to a channel group. The homogeneous channel descriptor may describe all such channel groups as being available during a particular time. For example, a first group of channels may exist for a cricket match (Team A vs Team B) while a second group of channels may exist for another cricket match (Team C vs Team D) occurring at the same time. Each channel in the group may be uniquely identified based on the transmission system they are carried in. In the digital video broadcasting ("DVB") world, the unique identifier for channel may be a DVB triplet comprising of original network ID ("ONID"), network ID ("NID") and the transport stream ID ("TSID"). In the ATSC/American standards, the unique identifier may simply be the sourceID. In an IP system, the unique identifier may take the form a unique multicast IP address and a port or any such mechanism that uniquely identifies a channel in the target broadcasting system.

Figure 1B:
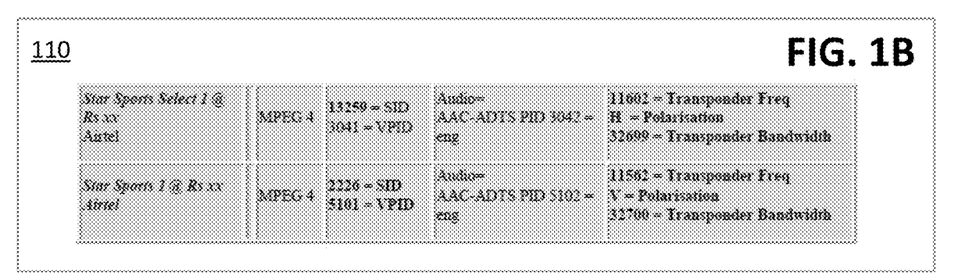
FIG. 1B shows an illustrative diagram of a channel map table, in accordance with some embodiments of the disclosure.

FIG. 1B shows an illustrative diagram of a channel map table (e.g., from a PMT), in accordance with some embodiments of the disclosure. The Channel map table, related to metadata schema 100, shows an example where the primary channel is Start Sports1 and the auxiliary channel is Star Sports Select1. In this example, the auxiliary channel is actually a premium channel that has no advertisements and instead fills in the advertisement time slots with expert commentary.

Figure 1C:
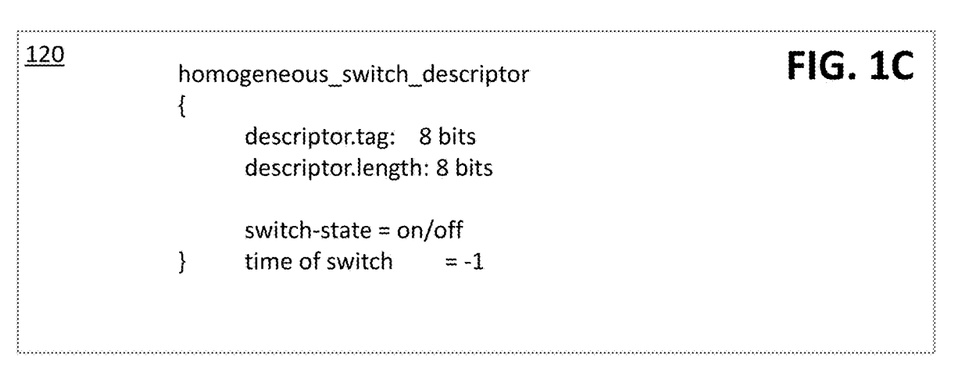
FIG. 1C shows an illustrative diagram of signaling mechanisms used to indicate subscriber devices using a homogeneous switch descriptor, in accordance with some embodiment of the disclosure.

FIG. 1C shows an illustrative diagram of signaling mechanisms used to indicate subscriber devices using a homogeneous switch descriptor, in accordance with some embodiment of the disclosure. The homogeneous switch descriptor 120 may be used to signal channel switches to one or more subscriber devices upon the content changing between the primary and auxiliary channel. The homogeneous switch descriptor may be sent as part of a Program Map Table ("PMT"), or Network Information Table ("NIT"), of each channel that is a part of the channel group in homogenous channel descriptor 100. Based on the switch state value set in the homogeneous switch descriptor 110, subscriber devices tuned to the auxiliary channels may trigger actions described as follows. When the switch state is "on," all subscriber devices that are tuned to auxiliary channels will implicitly tune to the primary channel. It may be noted that that channel tuning is implicit, meaning a user of the subscriber device may still see all channel attributes in a user interface corresponding to the auxiliary channel for which they are tuned. When the state is "off," all subscriber devices that are tuned to auxiliary channel will tune away from the primary channel and tune to auxiliary content using tune parameters provided for the auxiliary channel number.

The homogeneous switch descriptor 120 can also support a time field that specifies when the state change can be applied. The time field in the homogeneous switch descriptor may be useful in schemes where content creators may identify the time of switch between groups of related channels. In cases where the switch input is derived from content comparison, the time value may be −1, meaning immediate application of the state.

These metadata schemas or descriptors, illustrated in FIGS. 1A-1C, may be transmitted to the subscriber device as part of transport stream. A transport stream is a bitstream, being created according to the rules of transmission protocol, for data transmission. Transmitters receive digital signal from a broadcast center (e.g., headend) in a form of transport stream. There are a majority of standards for non-mobile fixed digital TV networks including DVB (European standard), ATSC (USA standard) or ISDB (Japanese standard). Each of these networks utilize transport stream generated in a specific format (e.g., MPEG-2 TS format, following international standard ISO-13818-1). Appropriate metadata schema can be generated to indicate group of related channels scheduled to transmit same content for most of the time segment for different transmission protocol.

The headend is where transport streams are generated, multiplexed and processed. The headend may be placed before the distribution network. Distribution networks process IP based transport streams transmission from broadcast center to transmitters. Global television programs may be transmitted via transport streams. It should be noted that a server may be used in place, or in conjunction, with the headend to transport IP data pertaining to video data for the purposes of the present disclosure. It may be technically advisable to reduce necessary distribution network bandwidth, without affecting the integrity (mitigated degradation), parameters, and time synchronization of the transport streams. Hence, the disclosed techniques achieve efficient use of network resources by avoiding the duplicative transmission of substantially similar content and only transmitting the differing segments for the premium broadcast. Moreover, this creates an opportunity to transmit auxiliary content (e.g., additional premium content) using some or all of the bandwidth being saved by avoiding duplicative transmissions.

Figure 1D:
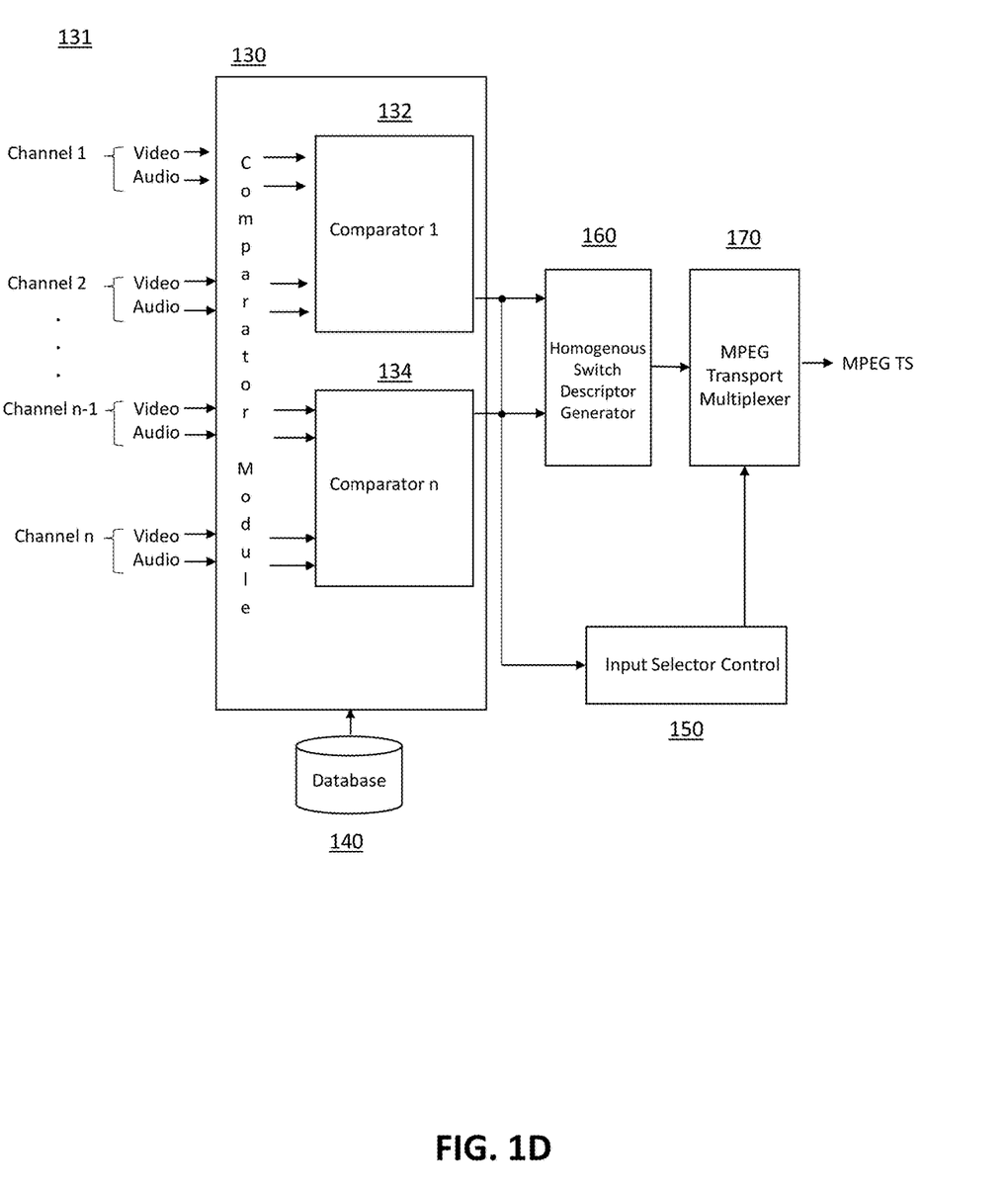
FIG. 1D shows an illustrative block diagram of system components for the process of optimizing bandwidth for broadcast transmission, in accordance with some embodiments of the disclosure.

FIG. 1D shows an illustrative block diagram 131 of system components for the process of optimizing bandwidth for broadcast transmission, in accordance with some embodiments of the disclosure. Various channels including channel 1, channel 2, up to channels n−1 and channel n, may be compared by headend using a comparator module 130 within the headend. For better optimization, the comparator module 130 may have sub-modules such as comparator 1 to comparator n (132 and 134 respectively). The comparator module 130 may receive information from a database 140. The database 140 may contain a listing of related channels, also referred interchangeably as channel groups that aid in channel comparison of similar channels. For example, channel 1 and channel 2 may be related in that channel 1 is Star Sports 1 and channel 2 is Start Sports Select 1. The comparators determine the differences in the video and/or audio contents of the channels and determine when the differences occur. Specific techniques that may be implemented for comparing the video and/or audio contents are discussed further in the present disclosure. Data relating to the temporal segments of the second channel which differ from the first video data are sent to an input selector control 150 and the homogenous switch descriptor generator 160. The input selector may select the appropriate channel during specific temporal time periods when the temporal segments of the second channel which differ from the first video data. The homogenous switch descriptor generator 160 is updated with information of temporal differences (e.g., audio feed and/or video feed of the channels) which is then output to the MPEG transport multiplexer 170. The MPEG transport multiplexer 170 multiplexes the information from the homogenous switch descriptor generator 160 and receives information from the input selector control to create the transport stream for the one or more subscriber devices. In some embodiments, the homogenous switch descriptor generator is embedded in a PMT during the multiplexing process.

In some embodiments, the MPEG transport multiplexer 170 may receive input associated a group of channels transmitting both identical content segments and content segments which are distinct. When a group of channels have substantially identical content for most of the duration to transmit, the multiplexer 170 may use only one audio/video feed associated with a selected primary channel to transmit the content and use audio/video feeds associated with all auxiliary channels to transmit other data, such as enhanced content, advertisement etc. Audio/video feeds associated with auxiliary channels will transmit data related to the content, only where the segments are different for two channels. As one may appreciate, the audio/video feeds associated with auxiliary channels that traditionally may have been used to transmit the same content can now be used to transmit other data.

In some embodiments, the content creators may supply metadata associated with differing segments. Consequently, the switch state of the homogeneous switch descriptors 100 may be updated using the metadata. In some embodiments, a comparator module 130 may need not perform a comparison to identify the common or distinct segments. In some embodiments, a homogeneous switch descriptor generator 120 may update the homogeneous channel descriptor 100. The homogeneous switch descriptor may then indicate group channels transmitting same content for most of the time, and metadata indicating at what time contents of two related channels are different. In some embodiments, the metadata schema also indicates when the feed needs to be switched at the subscriber device.

For example, a set top box may tune to channel 1 for Star Sports 1. The set top box may check for tuning overload (e.g., tuning overload refers to the identical video content is being played back on multiple channels). To check for tuning overload, the set top box may check for overload parameters in the homogeneous switch descriptor by parsing information in the PMT table or an equivalent message that carries it. If the parsed information provides data showing overload, the set top box may switch to the primary channel of the channel group. In the alternative, if the parsed information provides data showing no overload, the set top box may utilize the tuning parameters of its own channel to show auxiliary content.

The headend may determine whether a first content and a second content contain common segments. Returning to FIG. 1C, the determination may be performed by comparator module(s) (e.g., 130, 132, and/or 134) within the headend. In some embodiments, the determination of common content may be implemented by the headend retrieving the first content and the second content from content creators. The first content (for example a first video feed) and second content (a second video feed) may include video frame data which provides for a plurality of frames, which in aggregate comprise the first and second video feed respectively. The headend may for each video frame of the first video feed, determine whether the frame of the first video feed matches a corresponding frame of the second video feed. Continuing from the above example, the headend may retrieve a specific video feed from the standard cricket match and premium cricket match the respective video feeds to compare, frame-by-frame based on a specific timestamp, whether the standard cricket matches the premium cricket match timestamp. In some embodiments, the match for each timestamp may include identical timestamps, or even an offset of a pre-defined tolerance. In some embodiments, the comparison on aggregate may be compared to a predefined tolerance or an exact match of frame information. In some embodiments, the determination of whether the frame of the first video feed matches the corresponding frame of the second video feed includes comparison of RGB matrices. The headend may determine whether a first RGB matrix of the frame of the first video feed matches a second RGB matrix of the corresponding frame of the second video feed. In some embodiments, a force input on the comparator can trigger an overload message.

In other embodiments, the determination of common video content may be implemented by the headend executing checksum calculations. The headend may execute a first checksum calculation for the first video feed and a second checksum calculation for the second video feed. The headend may then determine whether the first checksum calculation matches the second checksum calculation. In a determination that the first and second checksum calculations are equivalent, the headend may determine that the first and second video feed contain common video content. In a determination that the first and second checksum calculations are not equivalent, the headend may determine that the first and second video feed do not contain common video content. In some embodiments, the headend may determine matching checksum calculations using time-based data. For example, the headend may determine at each corresponding timestamp for the first video feed and the second video feed, whether the first checksum calculation matches the second checksum calculation. In some embodiments, the headend may deem a match depending on a predefined overlap threshold. A predefined overlap threshold may be defined by the headend (e.g., greater than 50% checksum match for time-based data).

In some embodiments, the determination of common video content may be implemented by the headend retrieving time-based or temporal metadata of the first video feed and time-based or temporal metadata of the second video feed. The type of time-based or temporal metadata may be any time of data which has a temporal component. For example, first and second temporal metadata may include at least one of scene duration, scene timestamps, advertisement timestamps, musical interlude timestamps, end credit timestamps, opening credit timestamps, timestamps for non-native language dialogue, or timestamps for events within the video feed. Continuing from the example above, the headend may provide two transport streams of the cricket match. The first video feed may carry the standard cricket match with advertisements, while the second video feed may carry the premium version of the cricket match replacing the advertisements with live-commentary between overs.

In response to the determination that the first content and the second content contain at least one common segment, the headend may update the metadata schema to indicate at least one common segment of the first content and the second segment. For example, the headend inserts the identified differences as metadata using schemes outlined in FIGS. 1A-1C. Specifically, the headend may determine whether the first temporal metadata matches the second temporal metadata. A match may be within a common (e.g., predefined) tolerance of error, or an exact match of digital data. The tolerance of error may allow for minor synchronization issues to exist to allow for comparison of the video content without time bias. In this example, the standard and premium transport streams each contain common video feed during live action of the cricket match. However, the comparison executed by the headend shows that during an event break (e.g., advertisement, or intermission), the content for the premium transport stream differs from the standard transport stream.

The headend may, in response to the determination that the first video feed and the second video feed contain common video content, retrieve, from a data structure, identifiers of the second video feed. The identifiers may be as described in FIGS. 1A-1C.

The headend may, in response to the determination that the first video feed and the second video feed contain common video content, determine temporal segments of the second video feed differing from the first video feed. Based on the metadata or program identification ("PID") information for the second video feed, the specific temporal segments of the second video feed are determined which differ from the first video feed. The determination of the differing segments was completed during the determination that the first video feed and the second video feed contain common video content. Continuing from the above example, the differing segment table below shows determined temporal segments of the premium cricket match which differ from the standard cricket match:

| Temporal Timestamp in Playback | Type of Content |
|---|---|
| 0:03:29-0:05:53 | Commentary |
| 0:14:29-0:16:02 | Commentary |
| 0:30:00-0:55:00 | Intermission-full player interviews |
| 1:09:55-1:11:11 | Commentary |

In some embodiments, the headend may in response to the determination that the first video data and the second video data contain common video content, update the PMT. The PMT includes program identifiers and service identifiers of a plurality of programs, including the first video data and the second video data. In other embodiments, the metadata scheme is updated regarding the number of auxiliary channels (when common video content is found).

The headend may, in response to the determination that the first video feed and the second video feed contain common video content, transmit, to a subscriber device, the differing temporal segments of the second video feed, using the retrieved identifiers of the second video feed, during temporal segments of the first video feed matching timestamps of the differing temporal segments of the second video feed. For example, at the timestamp when the first and second videos differ, the differing temporal segments are transmitted to the subscriber device. In some embodiments, the headend transmits the differing temporal segments of the second video feed via a homogeneous switch descriptor in the PMT. Returning to FIG. 1C, a homogeneous switch descriptor generator 120 may create the homogeneous switch descriptor which is multiplexed by the MPEG Transport multiplexer 170 prior to the transmission (e.g., by MPEG Transport stream). For example, the below snippet describes a private descriptor (implementing the switch:

```
Homogeneous_Switch_Descriptor
{
                descriptor.tag: 8 bits
                descriptor.length: 8 bits
                switch-state  = on/off
}               time of switch = vtc
```

In the scenario where the headend operations are executed by a server, the transmission utilizes a multi-cast Internet protocol port to the subscriber device. The Internet protocol port corresponds to the second video feed.

In some embodiments, the metadata scheme (e.g., the updated homogeneous channel and switch descriptors) is embedded in the multiplexed transport stream and transmitted to the one or more subscriber devices via an entitlement management message ("EMM"). The EMM may be encoded (e.g., my MPEG encoders) via an Entitlement Management Message generator. An EMM is a type of conditional access system where the receiver performs decryption based on a control word when authorized to access a received data stream. At the EMM generator, the MPEG encoders encrypt the data stream with the control word. The one or more subscriber devices decode the EMM to retrieve the required information for input selector control for channel selection.

Figure 2:
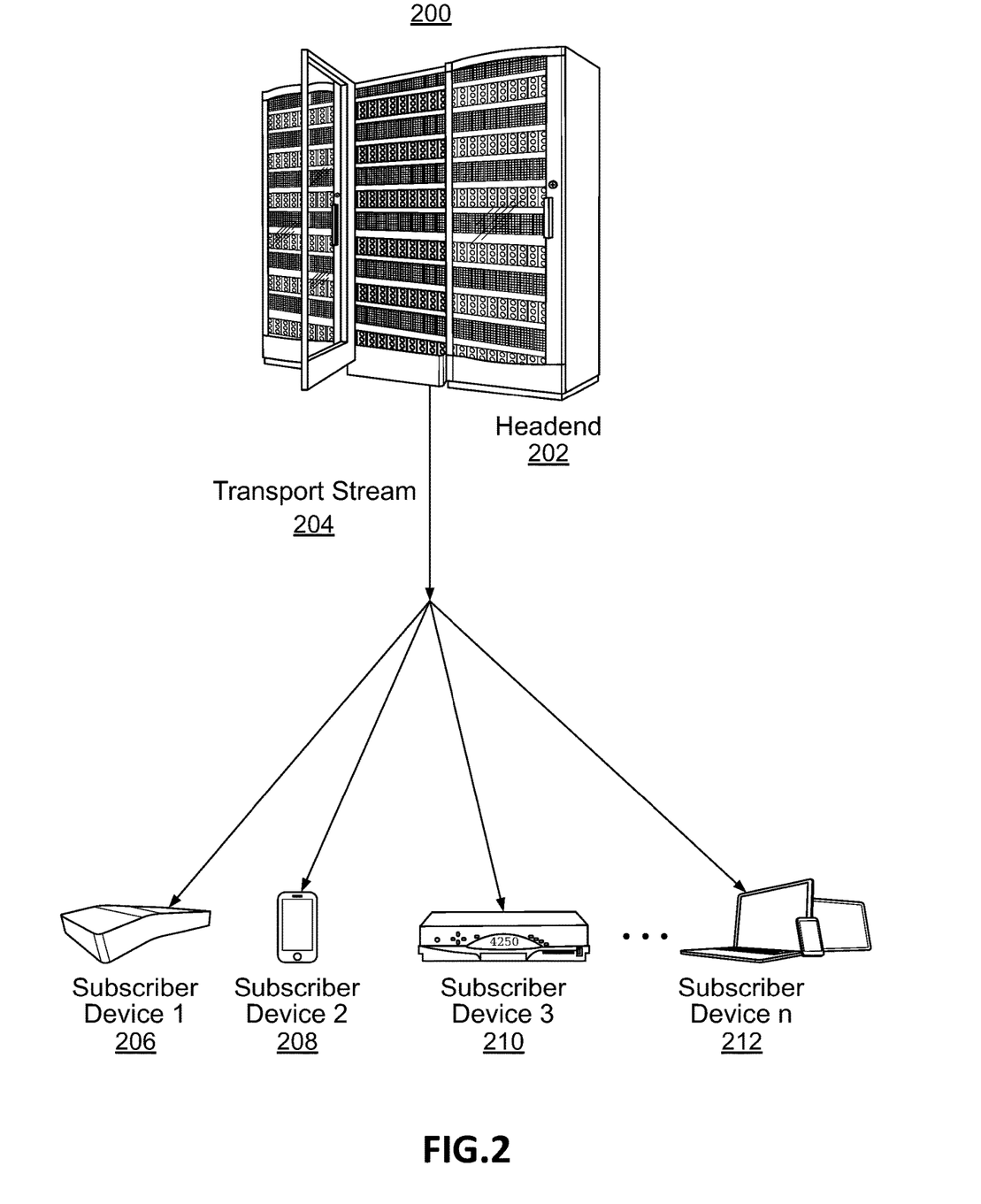
FIG. 2 shows an illustrative diagram of a broadcasting system broadcasting content to subscriber devices, in accordance with some embodiments of the disclosure.
Figure 3:
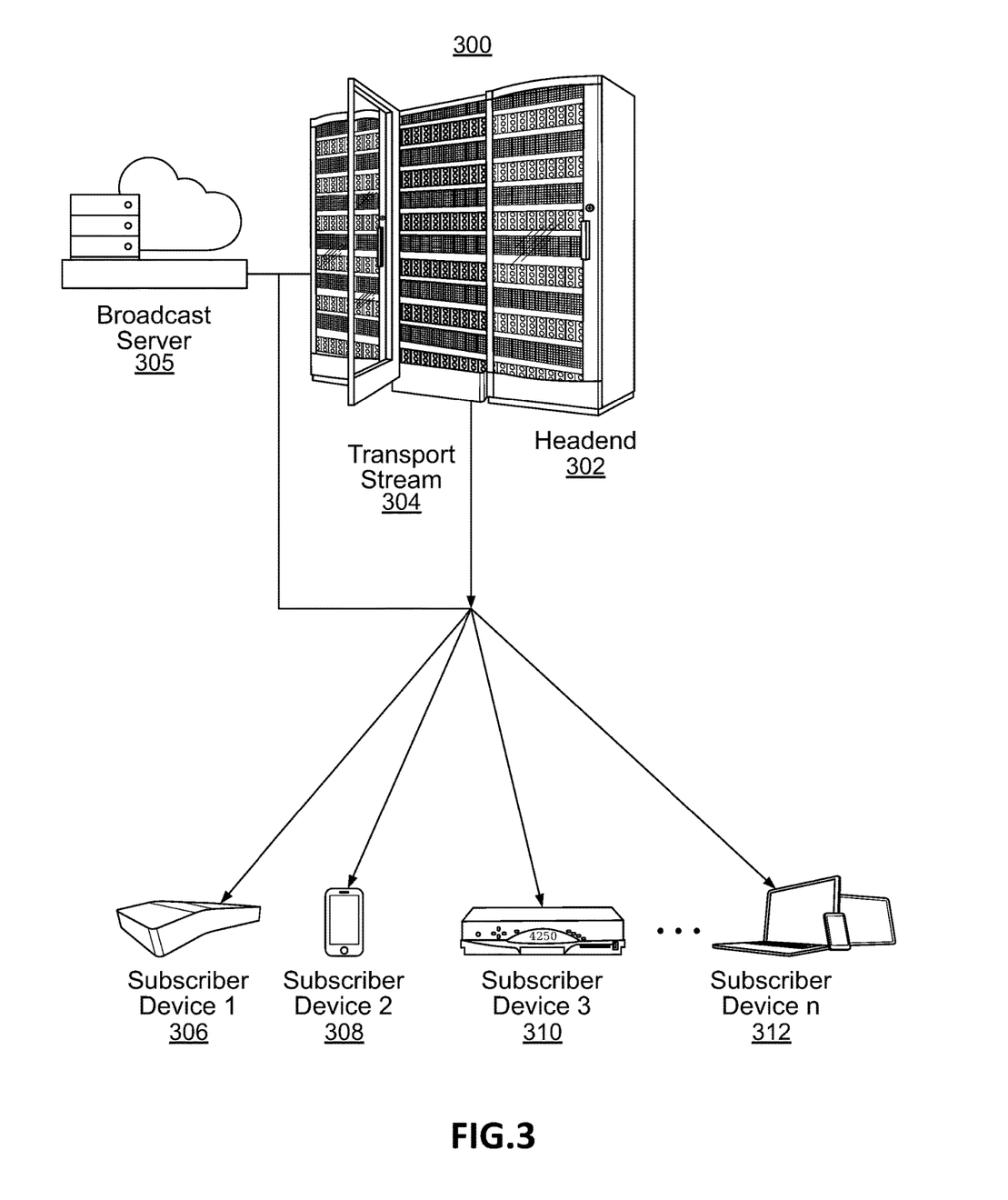
FIG. 3 shows an illustrative diagram of a broadcasting system comprising a broadcast server, in accordance with some embodiments of the disclosure.

FIG. 2 shows an illustrative diagram 200 of a broadcasting system broadcasting content to subscriber devices, in accordance with some embodiments of the disclosure. A headend 202 generates multiplexed program information and may transmit the transport stream 204 to one or more subscriber devices (e.g., subscriber device 1 (206), subscriber device 2 (208), subscriber device 3 (210), and subscriber device n (212)). The headend (or broadcast server) may be communicatively coupled to multiple subscriber devices (as shown in FIGS. 2-3). The headend may be communicatively coupled with a network information table (NIT). A further detailed disclosure on the headend can be seen in FIG. 4.

FIG. 3 shows an illustrative diagram 300 of a broadcasting system comprising a broadcast server and a headend, in accordance with some embodiments of the disclosure. In this system the broadcast server 305 and the headend 302 may collectively fulfil operations as described by the headend and/or broadcast server in the preceding examples. A headend 302 may be communicatively coupled with a broadcast server 305. The headend 302/broadcast server 305 generate multiplexed program information and may transmit the transport stream 304 to one or more subscriber devices (e.g., subscriber device 1 (306), subscriber device 2 (308), subscriber device 3 (310), and subscriber device n (312)).

The headend 202/302 uses the database 140 to form the channel groups and the channel associations in each group. The subscriber devices 206-212/306-312 may cache metadata schema received as part of the transport stream on each boot. Whenever the headend triggers a change in the table by means of a version change, mechanisms that are inbuilt within the transmission methodology are used for update. The subscriber devices may use the information in PMT to determine if it needs to respond to the homogeneous switch descriptor when it tunes to any channel associated within a channel group.

In some embodiments, the headend 202/302 (and similarly broadcast server 305) may be implemented remote from the subscriber devices and be communicatively coupled via radio antenna reception, cable reception (e.g., coaxial), microwave link, DSL reception, cable internet reception, fiber reception, over-the-air infrastructure, or other type of interface for receiving video data from a broadcaster. The headend may include a selection of hardware including RF circuitry, control circuitry, processing circuitry, and other infrastructure required to generate and interface with broadcast terrestrial and satellite feeds to distribute video content to subscriber devices. The broadcast server may be a smartphone, a Smart TV, a set-top box, an integrated receiver decoder (IRD) for handling satellite television, a digital storage device, a digital media receiver (DMR), a digital media adapter (DMA), a streaming media device, a local data structure, a personal computer (PC), a smart-home personal assistant, a laptop computer, a tablet computer, a WebTV box, a personal computer television (PC/TV), a PC data structure, a PC media center, a handheld computer, a personal digital assistant (PDA), a portable video player, a portable music player, a portable gaming machine, or any other television equipment, computing equipment, Internet-of-Things device, or wireless device, and/or combination of the same. Any of the system modules (e.g., headend, broadcast server, NIT, and subscriber devices) may be any combination of shared or disparate hardware pieces that are communicatively coupled.

In some embodiments, the metadata schema may be implemented by matrices (homogenous channel description and homogeneous switch descriptor), where the matrices may be integrated into the headend. In other embodiments, these may be a discrete piece of hardware interfacing with the headend by communicate coupling.

The subscriber devices 206-212/306-312 may be any device that has properties to receive video content. The subscriber devices may be a vehicle infotainment system, vehicle entertainment system, a vehicle navigation system, a smartphone, a smartwatch, a smart wearable device, a Smart TV, a streaming media device, a personal computer (PC), a smart-home personal assistant, a laptop computer, a tablet computer, a WebTV box, a personal computer television (PC/TV), a PC media center, a handheld computer, a personal digital assistant (PDA), a portable video player, a portable music player, a portable gaming machine, or any other television equipment, computing equipment, Internet-of-Things device, wearable device, or wireless device, and/or combination of the same with display capabilities.

Figure 4:
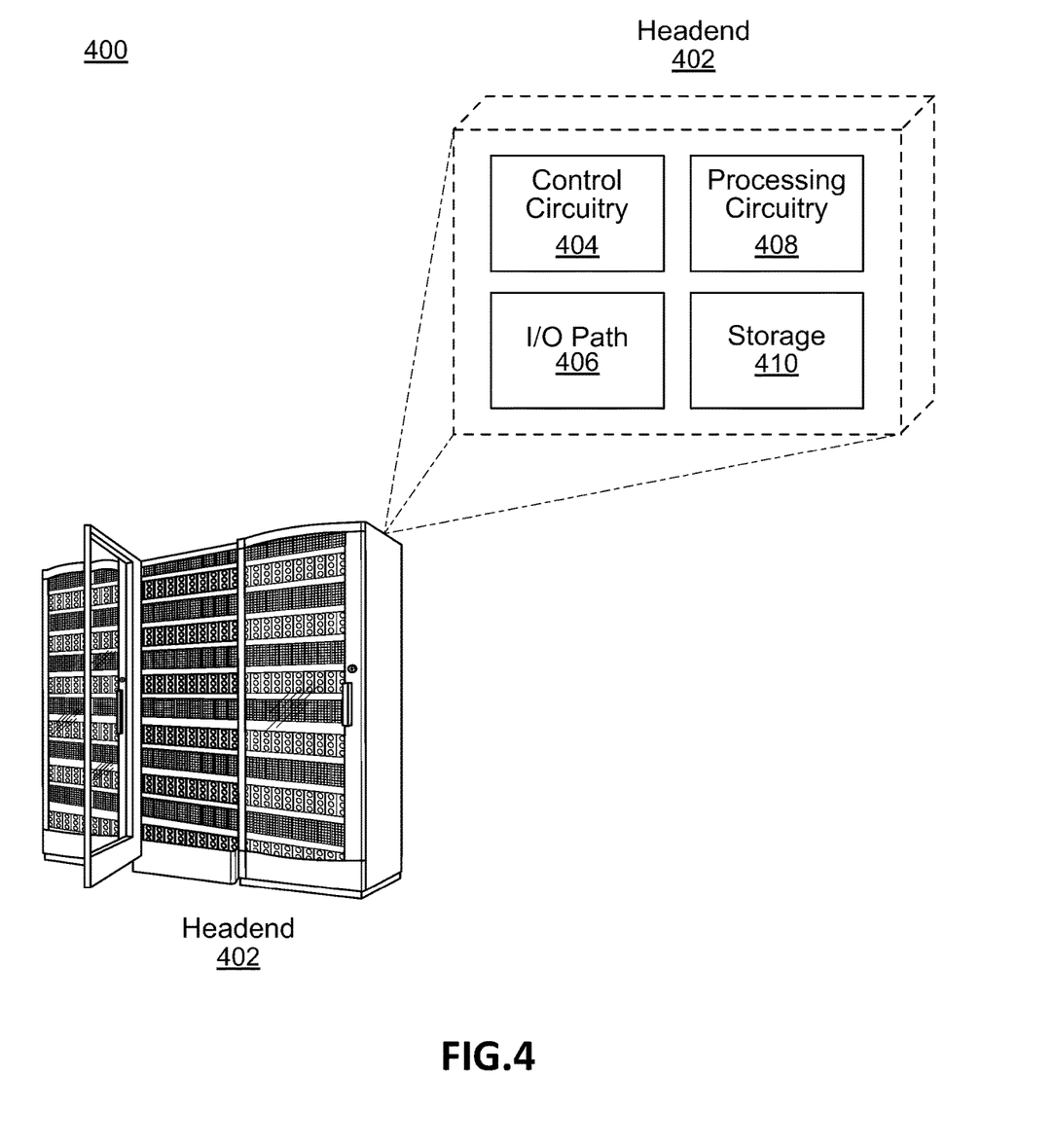
FIG. 4 shows an illustrative block diagram of the headend, in accordance with some embodiments of the disclosure.

FIG. 4 shows an illustrative block diagram 400 of the headend, in accordance with some embodiments of the disclosure. As stated earlier, as the broadcast server 305 may perform any/all of the functions of the headend in some embodiments, it may share the same hardware architecture. In some embodiments, the headend may be communicatively connected to a user interface. In some embodiments, the headend may include processing circuitry, control circuitry, and storage (e.g., RAM, ROM, hard disk, removable disk, etc.). The headend may include an input/output path 406. I/O path 406 may provide device information, or other data, over a local area network (LAN) or wide area network (WAN), and/or other content and data to control circuitry 404, that includes processing circuitry 408 and storage 410. Control circuitry 404 may be used to send and receive commands, requests, signals (digital and analog), and other suitable data using I/O path 406. I/O path 406 may connect control circuitry 404 (and specifically processing circuitry 408) to one or more communications paths.

Control circuitry 404 may be based on any suitable processing circuitry such as processing circuitry 408. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g. two Intel Core i7 processors) or multiple different processors (e.g., an Intel Core i5 processor and an Intel Core i7 processor). In some embodiments, control circuitry 404 executes instructions for a headend stored in memory (e.g., storage 410).

Memory may be an electronic storage device provided as storage 410, which is part of control circuitry 404. As referred to herein, the phrase "electronic storage device" or "storage device" should be understood to mean any device for storing electronic data, computer software, or firmware, such as random-access memory, read-only memory, hard drives, solid state devices, quantum storage devices, or any other suitable fixed or removable storage devices, and/or any combination of the same. Nonvolatile memory may also be used (e.g., to launch a boot-up routine and other instructions).

The headend 402 may be coupled to a communications network. The communication network may be one or more networks including the Internet, a mobile phone network, mobile voice or data network (e.g., a 5G, 4G or LTE network), mesh network, peer-to-peer network, cable network, cable reception (e.g., coaxial), microwave link, DSL reception, cable internet reception, fiber reception, over-the-air infrastructure or other types of communications network or combinations of communications networks. The headend may be coupled to a secondary communication network (e.g., Bluetooth, Near Field Communication, service provider proprietary networks, or wired connection) to the selected device for generation for playback. Paths may separately or together include one or more communications paths, such as a satellite path, a fiber-optic path, a cable path, a path that supports Internet communications, free-space connections (e.g., for broadcast or other wireless signals), or any other suitable wired or wireless communications path or combination of such paths. As described above in FIG. 4, an analogous block diagram would be applicable for the broadcast server.

Figure 5:
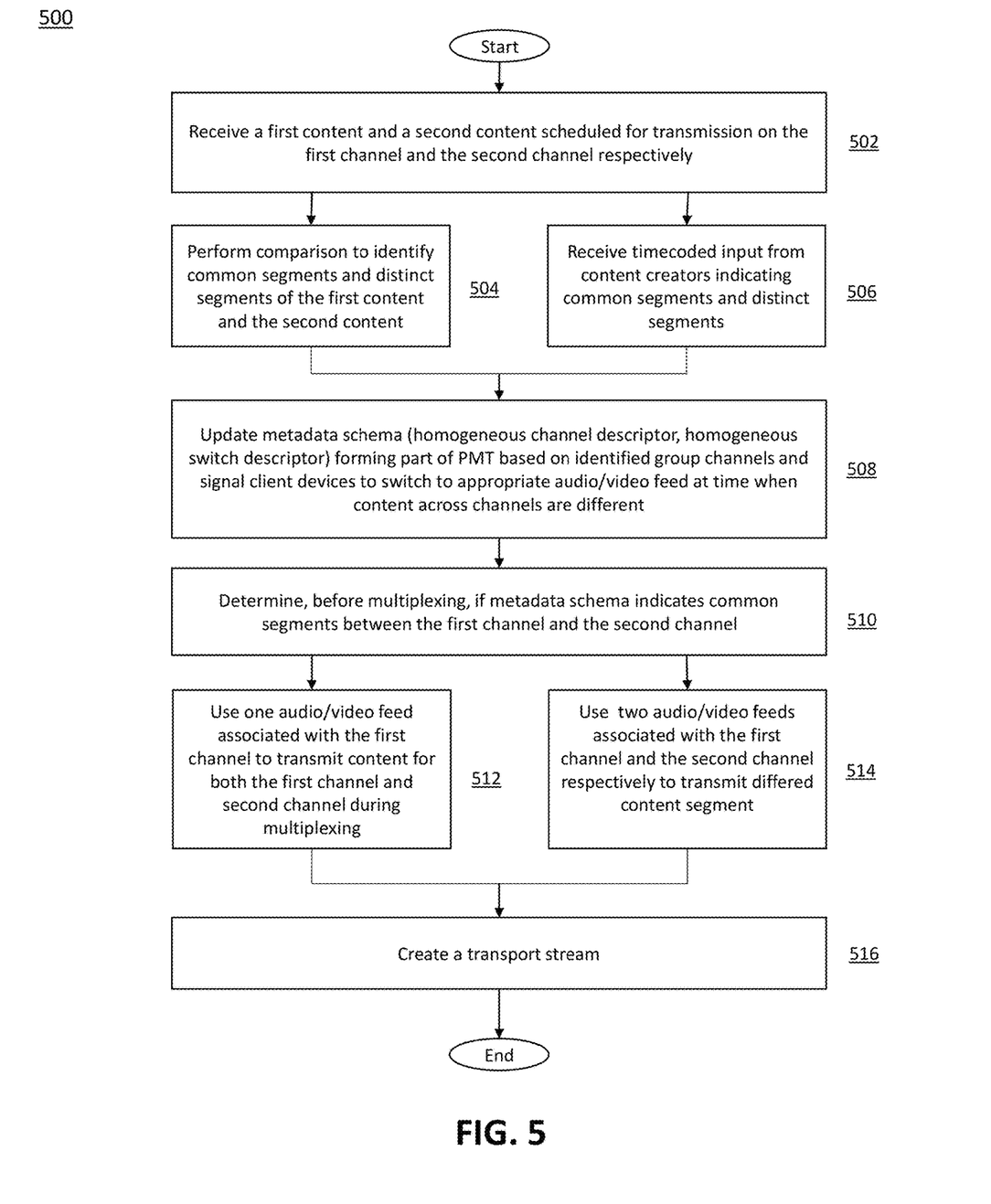
FIG. 5 is an illustrative flowchart of a process for creating a transport stream, in accordance with some embodiments of the disclosure.

FIG. 5 is an illustrative flowchart of a process for creating a transport stream, in accordance with some embodiments of the disclosure. Process 500, and any of the following processes, may be executed by control circuitry 404 (e.g., in a manner instructed to control circuitry 404 by the headend 402). Similar operations may be executed by the broadcast server 305. Control circuitry 404 may be part of a headend, or of a remote server separated from the headend by way of a communication network or distributed over a combination of both.

At 502, the headend 402, by control circuitry 404, receives a first content and a second content scheduled for transmission on first channel and second channel respectively. In some embodiments, the headend 402 may retrieve the first video data from the storage 410 of the headend. In other embodiments, the headend 402 may retrieve the first video data from a data structure via the I/O path 406.

At 504, the headend 402, by control circuitry 404, performs a comparison to identify common segments and distinct segments of first content and second content. In some embodiments, the determination of common segments and distinct segments of first content and second content is performed, at least in part, by processing circuitry 408.

At 506, the headend 402, by control circuitry 404, receives timecoded input from content creators indicating common segments and distinct segments. In some embodiments, the headend 402 may retrieve the timecoded input from content creators from a data structure or server via the I/O path 406.

At 508, the headend 402, by control circuitry 404, updates metadata schema forming part of PMT based on identified group channels and signal client devices to switch to the appropriate audio/video feed at time when content across channels are different. In some embodiments, the metadata schema are the homogeneous channel descriptor and the homogeneous switch descriptor.

At 510, the headend 402, by control circuitry 404, determines, before multiplexing, that metadata schema indicates common segments between the first channel and the second channel. In some embodiments, the determination is performed, at least in part, by processing circuitry 408.

At 512, the headend 402, by control circuitry 404, utilizes one audio/video feed associated with the first channel to transmit content for both the first channel and second channel during multiplexing of the first channel and the second channel.

At 514, the headend 402, by control circuitry 404, utilizes two audio/video feeds associated with the first channel and the second channel respectively to transmit differed content segment during multiplexing of the first channel and the second channel.

At 516, the headend 402, by control circuitry 404, creates a transport stream for transmission to the one or more subscriber devices. In some embodiments, transmission of the created transport stream to the subscriber devices 206-212/306-312 is via the I/O path 406.

Figure 6:
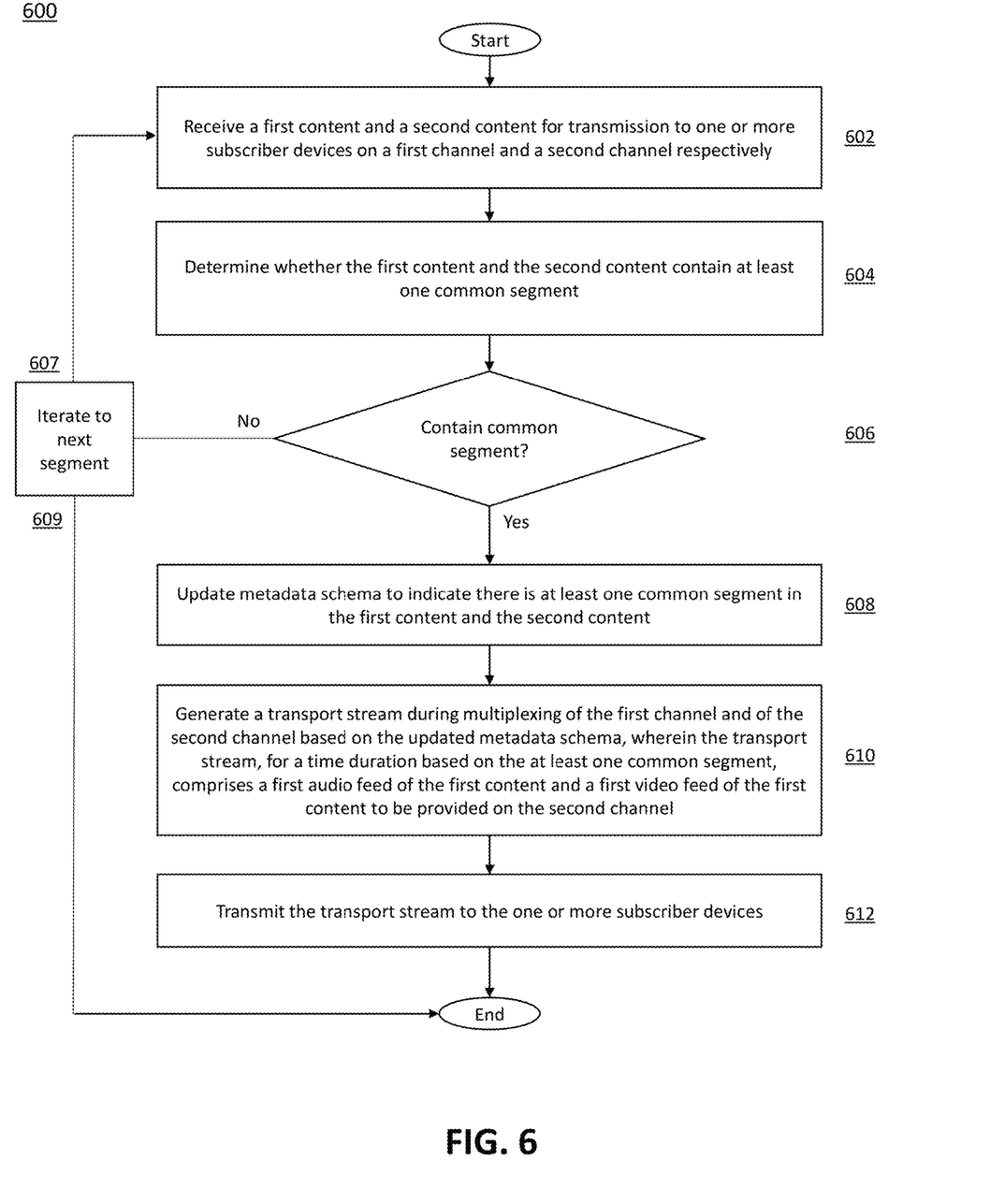
FIG. 6 is an illustrative flowchart of a process for determining first content and second content contain a common segment, in accordance with some embodiments of the disclosure.

FIG. 6 is an illustrative flowchart of a process 600 for determining first content and second content contain a common segment, in accordance with some embodiments of the disclosure. At 602, the headend 402, by control circuitry 404, receives a first content and a second content for transmission to one or more subscriber devices on a first channel and a second channel respectively. In some embodiments, the headend receives the first content and the second content from a content creator via the I/O path 406. In some embodiments, the headend 402 may receive the first content and the second content from the storage 410 of the headend.

At 604, the headend 402, by control circuitry 404, determines whether the first content and the second content contain at least one common segment. In some embodiments, the determination of whether the first content and the second content contain at least one common segment is performed, at least in part, by processing circuitry 408.

If, at 606, control circuitry determines "No," the first content and the second content do not contain at least one common segment, the process iterates to the next media asset. In some embodiments, at 607, the process reverts back to 602. In other embodiments, at 609, when there are no additional media assets, the process advances to END.

If, at 606, the control circuitry determines "Yes," the first content and the second content contain at least one common segment, the process advances to 608. At 608, the headend 402, by control circuitry 404, updates metadata schema to indicate there is at least one common segment in the first content and the second content.

At 610, the headend 402, by control circuitry 404, generates a transport stream during multiplexing of the first channel and of the second channel based on the updated metadata schema. The transport stream, for a time duration based on the at least one common segment, comprises a first audio feed of the first content and a first video feed of the first content to be provided on the second channel. In some embodiments, the generation of the transport stream is performed, at least in part, by processing circuitry 408.

At 612, the headend 402, by control circuitry 404, transmits, to a subscriber device, the transport stream to the one or more subscriber devices. In some embodiments, the headend transmits the transport stream to the one or more subscriber devices to the subscriber devices 206-212/306-312 via the I/O path 506.

Figure 7:
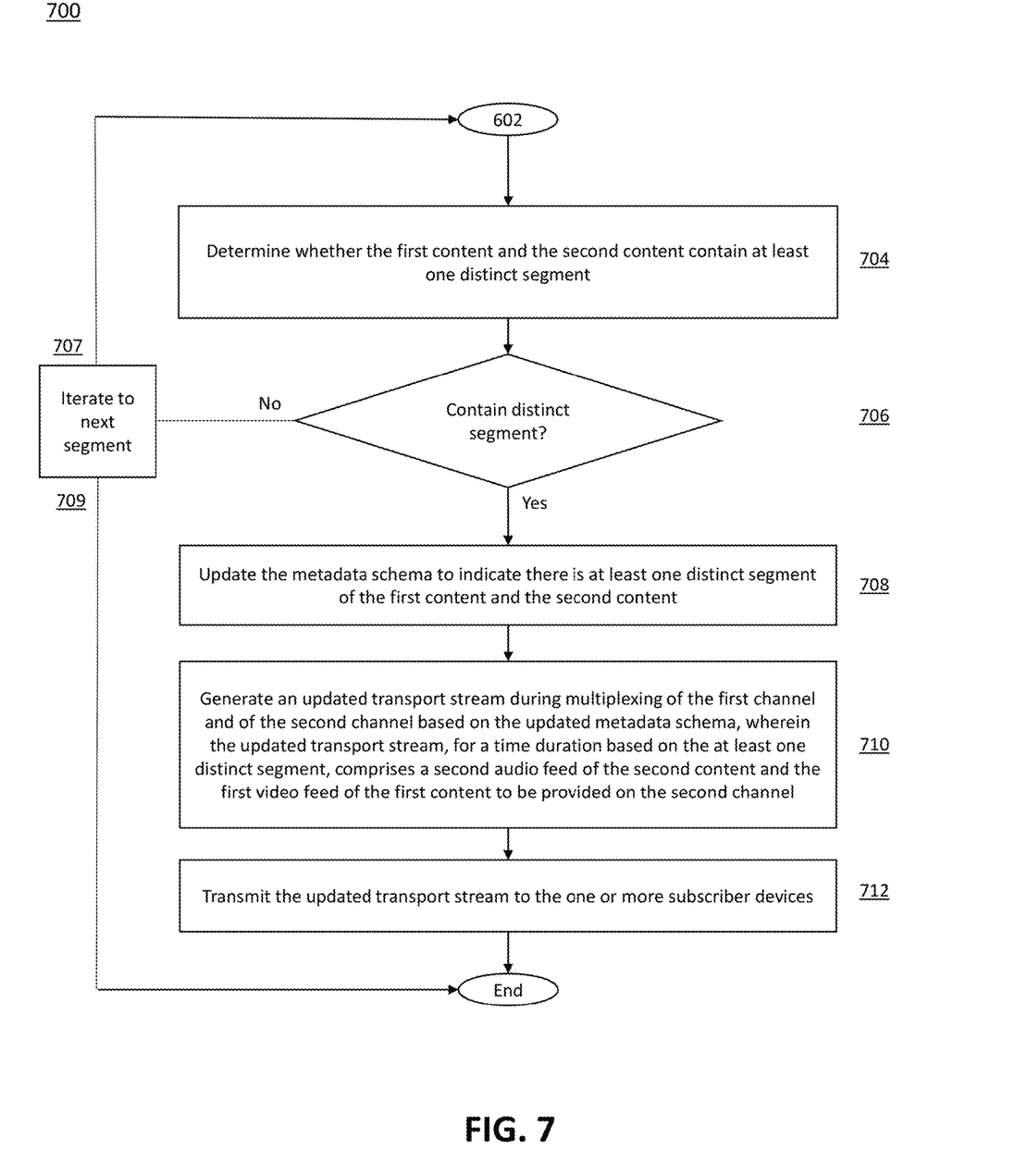
FIG. 7 is an illustrative flowchart of a process for determining first content and second content contain a distinct segment, in accordance with some embodiments of the disclosure.

FIG. 7 is an illustrative flowchart of a process 700 for determining first content and second content contain a distinct segment, in accordance with some embodiments of the disclosure. At 704, the headend 402, by control circuitry 404, determines whether the first content and the second content contain at least one distinct segment. In some embodiments, the determination of whether the first content and the second content distinct at least one common segment is performed, at least in part, by processing circuitry 408.

If, at 706, control circuitry determines "No," the first content and the second content do not contain at least one distinct segment, the process iterates to the next media asset. In some embodiments, at 707, the process reverts back to 602. In other embodiments, at 709, when there are no additional media assets, the process advances to END.

If, at 706, the control circuitry determines "Yes," the first content and the second content contain at least one distinct segment, the process advances to 708. At 708, the headend 402, by control circuitry 404, updates the metadata schema to indicate there is at least one distinct segment of the first content and the second content.

At 710, the headend 402, by control circuitry 404, generates an updated transport stream during multiplexing of the first channel and of the second channel based on the updated metadata schema. The updated transport stream, for a time duration based on the at least one distinct segment, comprises a second audio feed of the second content and the first video feed of the first content to be provided on the second channel. In some embodiments, the generation of the updated transport stream is performed, at least in part, by processing circuitry 408.

At 712, the headend 402, by control circuitry 404, transmits, to a subscriber device, the updated transport stream to the one or more subscriber devices. In some embodiments, the headend transmits the updated transport stream to the one or more subscriber devices to the subscriber devices 206-212/306-312 via the I/O path 506.

Figure 8:
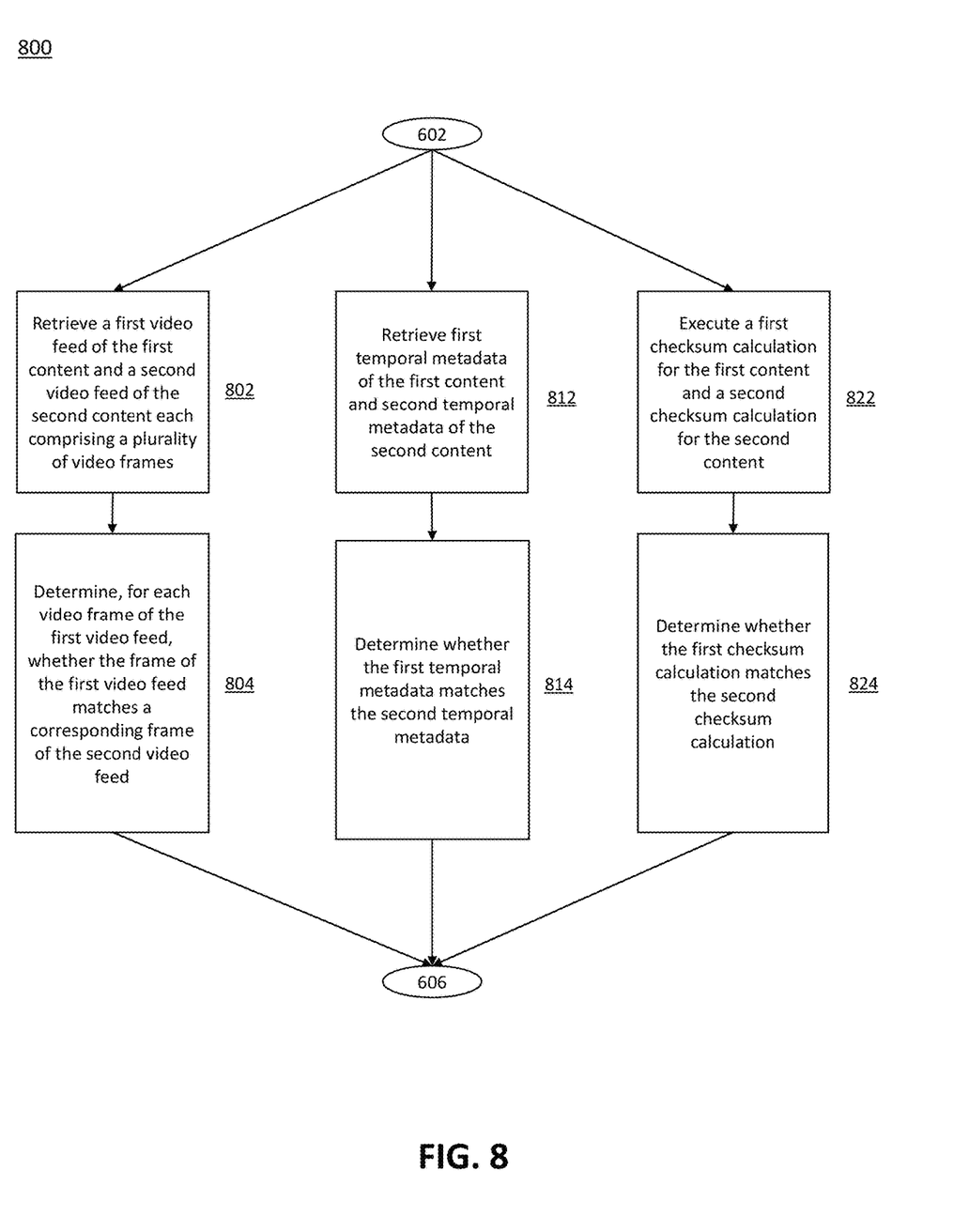
FIG. 8 is an illustrative flowchart of a process for determining whether first content and second content contain common temporal video segment, in accordance with some embodiments of the disclosure.

FIG. 8 is an illustrative flowchart of a process 800 for determining whether first content and second content contain common temporal video segment, in accordance with some embodiments of the disclosure. In some embodiments, at 802, the headend 402, by control circuitry 404, retrieve a first video feed of the first content and a second video feed of the second content each comprising a plurality of video frames.

In some embodiments, at 804, the headend 402, by control circuitry 404, determines, determines, for each video frame of the first video feed, whether the frame of the first video feed matches a corresponding frame of the second video feed. In some embodiments, the determination of whether the frame of the first video feed matches a corresponding frame of the second video feed is performed, at least in part, by processing circuitry 408.

In some embodiments, at 812, the headend 402, by control circuitry 404, retrieves first temporal metadata of the first video data and second temporal metadata of the second video data. In some embodiments, the headend 402 may retrieve the first temporal metadata of the first video data from the storage 410 of the headend. In other embodiments, the headend 402 may retrieve the first temporal metadata of the first video data from a data structure via the I/O path 406.

In some embodiments, at 814, the headend 402, by control circuitry 404, determines whether the first temporal metadata matches the second temporal metadata. In some embodiments, the determination of whether the first temporal metadata matches the second temporal metadata is performed, at least in part, by processing circuitry 408.

In some embodiments, at 822, the headend 402, by control circuitry 404, executes a first checksum calculation for the first video data and a second checksum calculation for the second video data. In some embodiments, the execution of the checksum calculations are performed, at least in part, by processing circuitry 408.

In some embodiments, at 824, the headend 402, by control circuitry 404, determine whether the first checksum calculation matches the second checksum calculation. In some embodiments, the determination of whether first checksum calculation matches the second checksum calculation is performed, at least in part, by processing circuitry 408.

It is contemplated that some suitable steps or suitable descriptions of FIGS. 5-8 may be used with other suitable embodiment of this disclosure. In addition, some suitable steps and descriptions described in relation to FIGS. 5-8 may be implemented in alternative orders or in parallel to further the purposes of this disclosure. For example, some suitable steps may be performed in any order or in parallel or substantially simultaneously to reduce lag or increase the speed of the system or method. Some suitable steps may also be skipped or omitted from the process. Furthermore, it should be noted that some suitable devices or equipment discussed in relation to FIGS. 2-3 could be used to perform one or more of the steps in FIGS. 5-8.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for optimizing bandwidth for data transmission, the method comprising:
receiving a first content and a second content for transmission to one or more subscriber devices on a first channel and a second channel respectively;
determining whether the first content and the second content contain at least one common segment, wherein, the determining comprises:
a determination whether the first video feed from the first content and a second video feed from the second content each comprise a plurality of video frames; and
for each video frame of the first video feed:
a determination whether a first RGB matrix of the frame of the first video feed matches a second RGB matrix of a corresponding frame of the second video feed; and
in response to determining that the first content and the second content contain at least one common segment:
updating metadata schema to indicate there is at least one common segment in the first content and the second content;
generating a transport stream during multiplexing of the first channel and of the second channel based on the updated metadata schema, wherein the transport stream, for a time duration based on the at least one common segment, comprises a first audio feed of the first content and the first video feed of the first content to be provided on the second channel; and transmitting, the transport stream to the one or more subscriber devices.

2. The method of claim 1 further comprising:
determining whether the first content and the second content contain at least one distinct segment; and
in response to the determination that the first content and second content contain at least one distinct segment:
updating the metadata schema to indicate there is at least one distinct segment of the first content and the second content;
generating an updated transport stream during multiplexing of the first channel and of the second channel based on the updated metadata schema, wherein the updated transport stream, for a time duration based on the at least one distinct segment, comprises a second audio feed of the second content and the first video feed of the first content to be provided on the second channel; and
transmitting, the updated transport stream to the one or more subscriber devices.

3. The method of claim 1, determining whether the first content and the second content contain at least one common segment comprises:
executing a first checksum calculation for the first content and a second checksum calculation for the second content; and
determining whether the first checksum calculation matches the second checksum calculation.

4. The method of claim 3, wherein the first content and second content comprise time-based data; and
wherein the determining whether the first checksum calculation matches the second checksum calculation comprises:
determining, at each corresponding timestamp for the first content and the second content, whether the first checksum calculation matches the second checksum calculation; and
determining whether the number of matching checksum calculations exceed a predefined overlap threshold.

5. The method of claim 1, wherein updating the metadata schema to indicate there is at least one common segment in the first content and the second content comprises:
updating a homogeneous channel descriptor and a homogeneous switch descriptor to indicate there is at least one common segment in the first content and the second content, wherein the metadata schema comprises the homogeneous channel descriptor and the homogeneous switch descriptor.

6. The method of claim 1, wherein, in response to the determination that the first content and the second content contain at least one common segment, further comprises:
updating a program map table comprising one or more program identifiers and one or more service identifiers of a plurality of programs comprising the first content and the second content; and
transmitting an entitlement management message to the one or more subscriber devices, wherein the entitlement management message comprises information from the updated program map table.

7. The method of claim 6, wherein transmitting the entitlement management message comprises:
determining a service identification of the transmission;
altering the service identification based on the updated network information table; and
configuring the switch type to a type corresponding to the altered service identification.

8. The method of claim 1, wherein, in response to the determination that the first content and the second content contain at least one common segment, further comprises:
transmitting a multi-cast Internet protocol port to the subscriber device, wherein the Internet protocol port corresponds to the second video data.

9. A system for optimizing bandwidth for broadcast transmission, comprising:
control circuitry configured to:
receive a first content and a second content for transmission to one or more subscriber devices on a first channel and a second channel respectively;
determine whether the first content and the second content contain at least one common segment; segment, wherein, the determining comprises:
a determination whether the first video feed from the first content and a second video feed from the second content each comprise a plurality of video frames; and
for each video frame of the first video feed:
a determination whether a first RGB matrix of the frame of the first video feed matches a second RGB matrix of a corresponding frame of the second video feed; and
in response to determining that the first content and the second content contain at least one common segment:
update metadata schema to indicate there is at least one common segment in the first content and the second content;
generate a transport stream during multiplexing of the first channel and of the second channel based on the updated metadata schema, wherein the transport stream, for a time duration based on the at least one common segment, comprises a first audio feed of the first content and a first video feed of the first content to be provided on the second channel; and
transmit, the transport stream to the one or more subscriber devices.

10. The system of claim 9, wherein the control circuitry is further configured to:
determine whether the first content and the second content contain at least one distinct segment; and
in response to the determination that the first content and second content contain at least one distinct segment:
update the metadata schema to indicate there is at least one distinct segment of the first content and the second content;
generate an updated transport stream during multiplexing of the first channel and of the second channel based on the updated metadata schema, wherein the updated transport stream, for a time duration based on the at least one distinct segment, comprises a second audio feed of the second content and the first video feed of the first content to be provided on the second channel; and
transmit, the updated transport stream to the one or more subscriber devices.

11. The system of claim 9, wherein the control circuitry is configured, when determining whether the first content and the second content contain at least one common segment, to:
execute a first checksum calculation for the first content and a second checksum calculation for the second content; and
determine whether the first checksum calculation matches the second checksum calculation.

12. The system of claim 11, wherein the first content and second content comprise time-based data; and
wherein the control circuitry is configured, when determining whether the first checksum calculation matches the second checksum calculation, to:
determine, at each corresponding timestamp for the first content and the second content, whether the first checksum calculation matches the second checksum calculation; and
determine whether the number of matching checksum calculations exceed a predefined overlap threshold.

13. The system of claim 9, wherein the control circuitry is configured, when updating the metadata schema to indicate there is at least one common segment in the first content and the second content, to:
update a homogeneous channel descriptor and a homogeneous switch descriptor to indicate there is at least one common segment in the first content and the second content, wherein the metadata schema comprises the homogeneous channel descriptor and the homogeneous switch descriptor.

14. The system of claim 9, wherein the control circuitry is further configured, when in response to the determination that the first content and the second content contain at least one common segment, to:
update a program map table comprising one or more program identifiers and one or more service identifiers of a plurality of programs comprising the first content and the second content; and
transmit an entitlement management message to the one or more subscriber devices, wherein the entitlement management message comprises information from the updated program map table.

15. The system of claim 14, wherein the control circuitry is configured when, transmitting the entitlement management message, to:
determine a service identification of the transmission;
alter the service identification based on the updated network information table; and
configure the switch type to a type corresponding to the altered service identification.

16. The system of claim 9, wherein the control circuitry is further configured, when in response to the determination that the first content and the second content contain at least one common segment, to:
transmit a multi-cast Internet protocol port to the subscriber device, wherein the Internet protocol port corresponds to the second video data.

* * * * *